J. A. ADAMS.
COMBINED AUTOMATIC AND STRAIGHT AIR VALVE MECHANISM.
APPLICATION FILED MAR. 8, 1915.
1,217,130.
Patented Feb. 27, 1917.
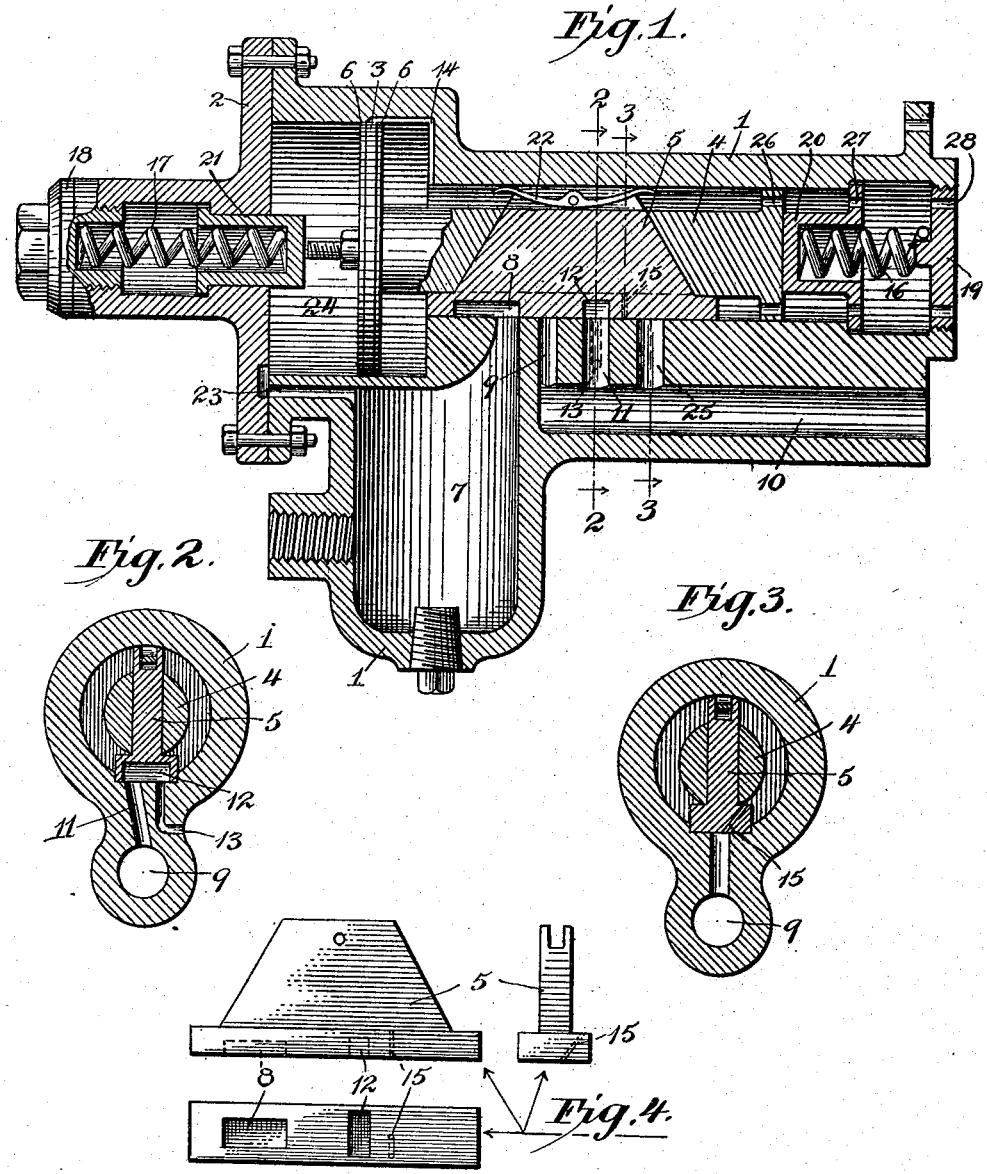

UNITED STATES PATENT OFFICE.

JOHN A. ADAMS, OF NOGALES, ARIZONA, ASSIGNOR, BY MESNE ASSIGNMENTS, TO ADAMS AIR BRAKE COMPANY, A CORPORATION OF NEW MEXICO.

COMBINED AUTOMATIC AND STRAIGHT AIR VALVE MECHANISM.

1,217,130.  Specification of Letters Patent.  Patented Feb. 27, 1917.

Application filed March 8, 1915. Serial No. 12,758.

*To all whom it may concern:*

Be it known that I, JOHN A. ADAMS, a citizen of the United States, residing at Nogales, in the county of Santa Cruz and State of Arizona, have invented new and useful Improvements in Combined Automatic and Straight Air Valve Mechanism, of which the following is a specification.

This invention relates in general to fluid pressure brakes, such as are usually operated by compressed air, and more especially to a combined automatic and straight air brake controlling valve designed for use on locomotives and cars, and adapted to be operated either automatically by reduction in the train brake pipe pressure and using the auxiliary reservoir reserve air in the usual way, or by increasing the normal train brake pipe pressure and using straight air from the main reservoir on the locomotive direct to the brake cylinder, and it consists in the combinations, constructions and arrangements herein described and claimed.

One of the objects of my invention is to provide an improved combined automatic and straight air valve mechanism for setting the brakes, either by reducing or increasing the normal train brake pipe pressure through the engineer's brake valve.

Another object of my invention is to provide an improved apparatus of the type described, whereby the brakes may be applied and released or controlled at will, either by the use of automatic or straight air, regardless of the weight or tonnage of a car or the different train brake pipe pressures.

Other objects and advantages will appear in the following specification and the novel features of the device will be particularly pointed out in the appended claim.

My invention is illustrated in the accompanying drawing forming part of this application in which—

Figure 1 is a view showing the central vertical section through the device;

Fig. 2 is a cross section view along the line 2—2 of Fig. 1.

Fig. 3 is a cross section view along the line 3—3 of Fig. 1.

Fig. 4 is a plan view of the slide valve, showing end and side elevations.

In my prior application filed Jan. 21, 1915, Serial Number 3,441, I have shown the piston valve control for a straight air application of the brakes. The present invention is an improvement on this valve in that the automatic and straight air may be applied and controlled and the exhaust port governed through one slide valve.

In the following specification I will describe completely the novel combined automatic and straight air valve mechanism and the operation thereof, and only so much of the ordinary air brake mechanism which coöperates therewith as will be sufficient for a clear understanding of the use and operation of my invention.

In carrying out my invention I provide a valve casing 1 of suitable shape. In the present instance I have shown this as a cylinder provided with a cap 2 which may be secured to the body portion in any suitable manner.

Within the interior of the valve casing is a piston valve 3 designed to operate the piston valve rod 4 which controls the slide valve 5. Packing rings 6 are provided for the piston valve. The slide valve 5 is designed to control the air pressure flowing from the train brake pipe to the brake cylinder through cavity 7 when an increase over the normal train brake pipe pressure is made, which moves the piston valve 3 from its normal position and forces the slide valve to uncover a port 9 leading into a passage 10 and direct to the brake cylinder for a straight air application of the brakes. At 13 is shown an exhaust port normally open but adapted to be closed by either an increase or reduction of air pressure in the train brake pipe. A feed groove 14 in the piston cylinder cavity is provided to keep the auxiliary reservoir charged. At 15 is shown a port which allows the excess air pressure entering the auxiliary reservoir through seepage groove 14, when a straight air application is made by increasing the train brake pipe pressure, to pass on to the brake cylinder, thereby preventing any overcharge of pressure in the auxiliary reservoir which may be caused by increasing the train brake pipe pressure for a straight air application of the brakes.

At 16 and 17 are shown two springs, which are provided for the purpose of moving the piston valve 3 to its normal position when the train brake pipe and auxiliary reservoir air pressures have equalized through the seepage groove 14. Backing plugs 18 and 19 are provided to hold the springs in position. At 20 and 21 are shown two bushings, which are provided for the purpose of limiting the movement of springs 16 and 17. At 22 is shown a slide valve spring to keep same properly seated. Passage 23 is provided for the purpose of allowing the air coming from the train brake pipe through cavity 7 to pass into piston valve cavity 24. At 25 is shown a port connecting the auxiliary reservoir pressure with passage 10 leading to the brake cylinder, when a reduction in the train brake pipe pressure is made for an automatic application of the brakes and it is also used to vent off the excess air pressure from the auxiliary reservoir through port 15 when a straight air application of the brakes is made. It will thus be seen that any increase in the train brake pipe pressure above normal will move the piston valve 3 and the slide valve 5 will cover the exhaust port 13 and uncover the port 9, admitting the straight air direct to the brake cylinder from cavity 7 through port 8 in slide valve into port 9 and passage 10.

From the foregoing description of the various parts of the device, the operation thereof may be readily understood.

To make an automatic service or emergency brake application with my combined automatic and straight air valve, the engineer makes a reduction in the normal train brake pipe air pressure in the usual way through the engineer's valve. This permits the release of the air from the train line side of piston valve cavity 24 through passage 23 and cavity 7; the auxiliary reservior air pressure then forces the piston valve to move in the direction of spring 17; the slide valve 5 then covers the exhaust port 13 and uncovers port 25; the auxiliary reservoir air pressure then flows through passage 10 direct to the brake cylinder which makes an automatic application of the brakes, the force of the application being controlled by the amount of reduction made through the engineer's brake valve.

To release the automatic application of the brakes, the engineer re-charges the train brake pipe, which forces the piston to uncover the feed groove 14 and allows the air to pass through the passages 26, 27 and 28 to the auxiliary reservoir. When the air pressure is again equalized on both sides of the piston valve 3 the spring 16 forces it to its normal position and the slide valve port 12 uncovers the port 11 and exhaust port 13 releasing the air from the brake cylinder to the atmosphere, thus releasing the brakes.

To make a straight air service or emergency brake application with my combined automatic and straight air valve, the engineer increases the normal train brake pipe pressure, cavity 7 being connected directly to the train brake pipe, air passes from the train brake pipe through cavity 7 and passage 23 into the piston valve cylinder, where it forces the piston valve 3 to move the slide valve 5 covering the exhaust port 13 and uncovering the port 9 which permits the air to flow into passage 10 and on to the brake cylinder, thereby setting or applying the brakes.

The amount of increased air pressure added to the normal train brake pipe pressure as above described, to set the brake with my combined automatic and straight air valve, also keeps the auxiliary reservoir charged through the seepage groove 14. The port 15 is arranged in the slide valve 5 to drain the excess air pressure accumulated in the auxiliary reservoir when making a straight air brake application and is covered when the air pressure equalizes on both sides of the piston valve 3; the spring 16 moving the valve to its normal position covers the port 9 and uncovers the exhaust port 13 in the casing when the train brake pipe pressure is reduced to normal through the engineer's valve. This permits the release of the air from the brake cylinder to the atmosphere, thus releasing the brakes.

It will thus be seen that it depends entirely on the amount of increased air pressure which the engineer adds to the normal train brake pipe pressure how hard the brakes are applied, as he has complete control and can make either an automatic or straight air application of the brakes at will, by the use of the engineer's brake valve on the engine. By the use of my valve it is impossible to loose the braking power, since any position, other than running or lap positions of the engineer's brake valve will apply the brakes.

By the use of my valve, the brakes can be applied by both the use of straight air and automatic air. Straight air can be applied to the brakes and automatic air can be applied on top, or automatic air can be applied to the brakes and straight air can be applied on top, but with my valve it is better to use straight air in all cases, thereby having the automatic air in reserve in case of accident, such as the parting of a hose connection or the breaking of a train brake pipe. As is clearly seen, the auxiliary reservoir is kept charged by the use of my valve.

By the use of my valve using straight air, the pressure in each brake cylinder will be the same, whether the cylinder piston is set to travel five inches or ten inches, for the reason that the increased air pressure applied to the normal train brake pipe pressure at the engine, is equally distributed through my valve to the brake cylinders. This prevents to a large extent, the parting or breaking in two of the train, as is now the case very often with the present system of automatic brakes. My valve will act perfectly, regardless of the weight or tonnage of a car or the different train brake pipe pressures, and permits of a gradual control by using either automatic or straight air for a brake application.

Having now described my invention, what I claim as new and desire to secure by Letters Patent is:—

In an air brake system, a combined automatic and straight air valve mechanism for controlling the brakes, comprising a casing provided with a main piston valve chamber, a piston valve disposed in said chamber, packing rings for said piston valve, a piston valve rod extending through said piston valve, a passage for establishing communication between said main piston valve chamber and the auxiliary reservoir, a feed groove in the wall of the casing around said piston valve when the latter is moved from its normal position by an increase in the normal train brake pipe pressure, a cavity in the lower part of said valve casing to receive a supply of compressed air, a passage in the wall of the casing connecting said cavity with the main piston valve chamber, a passage connecting said cavity with the ports leading to the brake cylinder and means for establishing communication between the auxiliary reservoir and the brake cylinder, said means comprising a slide valve operated by the movement of said piston valve by increasing or reducing the train brake pipe air pressure by the manipulation of the engineer's brake valve, a port connecting the brake cylinder with the auxiliary reservoir air pressure normally covered and adapted to be uncovered when a reduction in the train brake pipe is made for an automatic application of the brakes and means for controlling the exhaust port and establishing communication between the train line cavity and the passage connecting with the brake cylinder for a straight air application of the brakes, said means comprising a slide valve, a passage in said slide valve, a port connecting passage leading from the brake cylinder to said slide valve, said port being normally covered and adapted to be uncovered by the movement of the piston valve when the train brake pipe normal pressure is increased for a straight air application of the brakes, an exhaust port through the slide valve connecting the passage leading from the brake cylinder to the atmosphere normally uncovered and adapted to be covered by the movement of the piston valve, by either increasing or reducing the normal train brake pipe air pressure to make an automatic or straight air application of the brakes, springs for moving the piston valve to its normal position when the air pressure is equalized on both sides, a port through slide valve to vent auxiliary reservoir pressure to brake cylinder when a straight air application of the brakes is made, a cap for closing the main piston valve chamber, bushings for limiting the movement of springs and holding the piston valve in its normal position, a plug for closing the spring cavity in the cylinder cap and a backing plug to hold spring in position with passage for air to the auxiliary reservoir.

In testimony whereof I affix my signature in the presence of two witnesses.

JOHN A. ADAMS.

Witnesses:
 D. T. SCHETTER,
 A. N. MITCHELL.

Copies of this patent may be obtained for five cents each, by addressing the "Commissioner of Patents, Washington, D. C."